May 14, 1929. E. V. PENFOLD 1,713,191

DEVICE FOR RENDERING IGNITION CIRCUITS OF MOTOR VEHICLES INOPERATIVE

Filed Jan. 2, 1923

Inventor,
Edward V. Penfold
by Geyer Doyy
Attorneys.

Patented May 14, 1929.

1,713,191

UNITED STATES PATENT OFFICE.

EDWARD V. PENFOLD, OF HAMBURG, NEW YORK.

DEVICE FOR RENDERING IGNITION CIRCUITS OF MOTOR VEHICLES INOPERATIVE.

Application filed January 2, 1923. Serial No. 610,113.

This invention relates to a device for rendering the ignition circuit of a motor-driven vehicle inoperative when the vehicle assumes a dangerously inclined position, the improvement being applicable to tractors.

It is common for certain types of tractors now in use to turn over rearwardly when they strike an obstruction or the tractor wheels get stuck in the ground. Such accidents have frequently proved fatal to the drivers of such vehicles and this invention is designed to guard against them.

Its principal object is the provision of an improved gravity-actuated device of this character which is automatic and reliable in operation.

Other objects are to provide an improved short-circuiting device which is simple and compact in construction, and can be manufactured at a moderate cost, and which can be readily installed.

Figure 1:
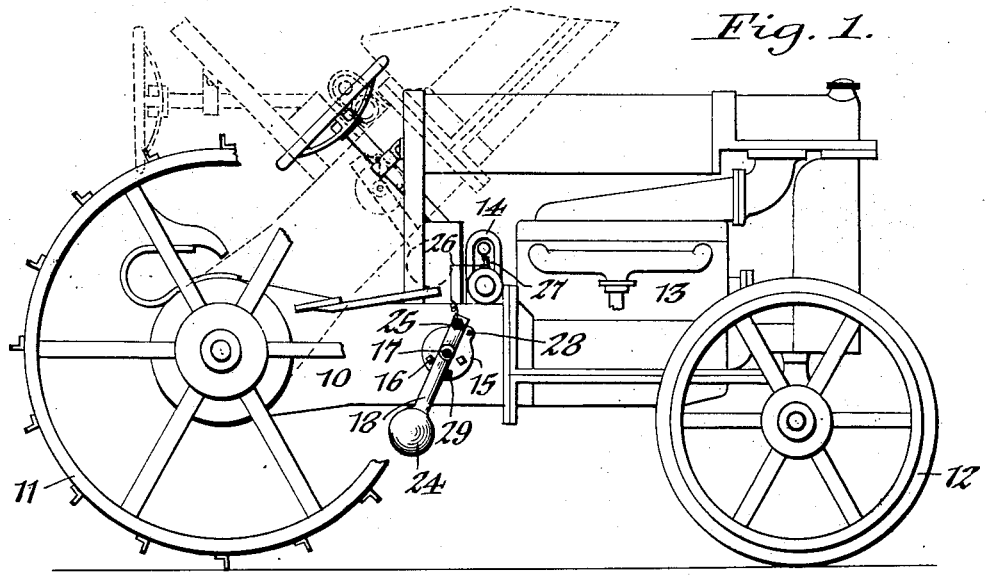
Figure 2:
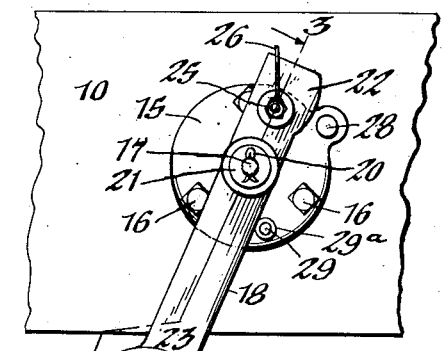
Figure 3:
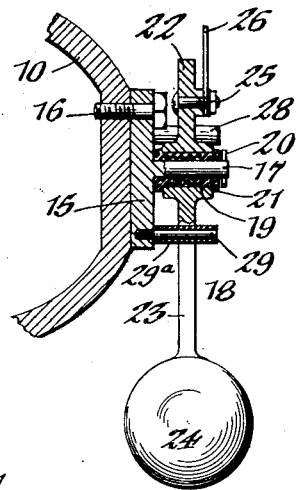
Figure 4:
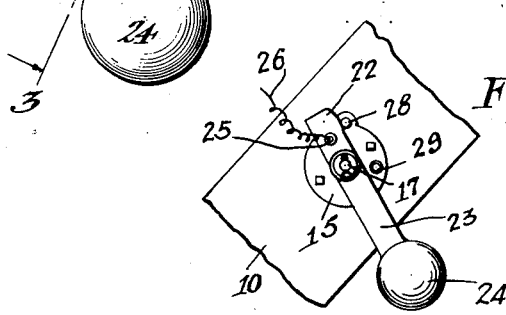

In the accompanying drawings: Figure 1 is a side elevation of a tractor equipped with the improvement. Figure 2 is an enlarged side view of the device. Figure 3 is a transverse vertical section on line 3—3, Fig. 2. Figure 4 is a side view of the device on a reduced scale showing the position of the parts when the tractor rears.

Similar characters of reference indicate corresponding parts in the several views.

By way of example, the invention is shown as applied to a tractor of well-known construction, which comprises a frame 10, rear traction wheels 11, front steering wheels 12 and an internal combustion engine 13 mounted at the front end of said frame. 14 represents the magneto which forms part of the usual ignition system of the engine.

Mounted on the side of the frame 10 in front of the rear axle thereof is a base plate 15 which may be formed of conducting material, such as brass or iron, and which is secured to said frame by bolts 16 or other suitable means. Carried by this base plate and projecting from the outer side thereof is a horizontal pivot pin 17 upon which a vertically-swinging pendulum-like switch member or lever 18 is fulcrumed. This switch member is of brass or similar conductive material and is included in the ignition circuit of the engine, the same being insulated from its pivot pin and the base plate 15 by a flanged fiber bushing 19. In the construction shown, a cotter pin 20 serves to hold the switch member on the pivot pin 17 and a fiber washer 21 is interposed between said cotter pin and the opposing end of said switch member, as shown in Fig. 2. The latter is preferably fulcrumed between its ends to provide a comparatively short upper arm 22 and a relatively long lower arm 23, said lower arm being provided at its lower end with a weight 24. The upper arm 22 of the switch member is provided with a terminal post 25 which is preferably connected by a flexible conductor 26 with the magneto contact post 27, as shown in Fig. 1.

28 represents a ground contact-post secured to the base plate and projecting outwardly therefrom. This post is arranged in the path of travel of the upper arm 22 of the switch member, so that the opposing edge of said arm engages said post when the tractor for any reason rears to a dangerous position, such as shown by dotted lines in Fig. 1 and by full lines in Fig. 4. When the switch member engages the contact post 28, due to such rearward tilting of the tractor, the magneto is short-circuited or grounded, the short-circuiting path being from the magneto-contact post 27, through the conductor 26, switch member 18, contact post 28, base plate 15, bolts 16 and thence to the frame 10 of the tractor. Under these conditions, the ignition circuit is rendered inoperative and the engine therefore stops, allowing the raised front end of the tractor to drop to its normal position, shown by full lines in Fig. 1. As the tractor returns to this position, the arm 22 of the switch member recedes from the contact post 28, thereby automatically restoring the ignition circuit to its normal operative position without any special attention on the part of the operator.

In order to prevent vibration of the pendulum-like switch member 18 in starting the tractor or in traveling over rough ground, with the resultant effect of throwing the ignition on and off and causing irregular running of the motor, means are provided for holding said switch member against such swinging movement under normal conditions. For this purpose, a stop pin or abutment 29 is mounted on the base plate 15 against which the weighted arm 23 of the switch member normally abuts. This arm is insulated from said stop-pin by a fiber bushing 29ᵃ covering the pin, or other suitable means to prevent grounding or short-circuiting under ordinary conditions. As shown in Figs. 1 and 2, this stop-pin is preferably disposed below the fulcrum pin 17 of the switch member and in a plane somewhat in advance thereof, so that said weighted arm is normally held against said pin in an overhanging or rearwardly inclined position by its own weight. The switch member therefore cannot vibrate under normal conditions, and as its upper arm 22 is clear of the contact post 28 in this position, the ignition circuit remains operative. It is to be understood that normally the angle of inclination of the switch member relative to the vertical is less than the fatal angle to which the tractor must tilt or rear in order to turn completely over. The switch member does not begin to move toward the contact post 28 until the inclination of the tractor reaches an angle equal to that of the switch member with the vertical, but the moment the tractor rears beyond this point, the switch member swings in the proper direction to bring its upper arm against the contact post 28, thereby rendering the ignition circuit inoperative, stopping the motor and preventing the tractor from turning over.

This improved device effectively guards against vehicles, such as tractors, turning completely over, rendering them safe at all times. Furthermore, it functions automatically to render the ignition circuit inoperative and operative. Owing to its simplicity of construction and minimum number of parts, the same is not liable to get out of order, and it requires no special adjustment or attention on the part of the operator.

I claim as my invention:

1. An automatic ignition circuit control for tractors, comprising a supporting member of conducting material adapted for attachment to the tractor-frame and having a pivot pin projecting therefrom, a pendulum-like switch lever of conducting material fulcrumed intermediate its ends on said pivot pin and insulated from the latter, the lower arm of said switch lever being weighted to normally maintain it in a pendant position and its upper arm having a terminal post thereon included in the ignition circuit, and a ground contact post carried by said supporting member and arranged in the path of movement of the upper arm of said switch lever to contact therewith and render the ignition circuit inoperative when the tractor is tilted to an abnormal position.

2. An automatic ignition circuit control for tractors, comprising a supporting member of conducting material adapted for attachment to the tractor-frame and having a pivot pin projecting therefrom, a pendulum-like switch lever of conducting material fulcrumed intermediate its ends on said pivot pin and insulated from the latter, the lower arm of said switch lever being weighted to normally maintain it in a pendant position and its upper arm having a terminal post thereon included in the ignition circuit, a ground contact post carried by said supporting member and arranged above said pivot pin and in the path of movement of the upper arm of said switch lever to contact therewith and render the ignition circuit inoperative when the tractor is tilted to an abnormal position, and an anti-vibration stop carried by said supporting member and arranged below said pivot pin and with which the lower arm of said switch lever normally contacts to hold the latter in circuit-operative position, said switch lever being normally inclined toward the rear of the tractor when the same occupies a substantially level position.

EDWARD V. PENFOLD.